Patented Jan. 6, 1953

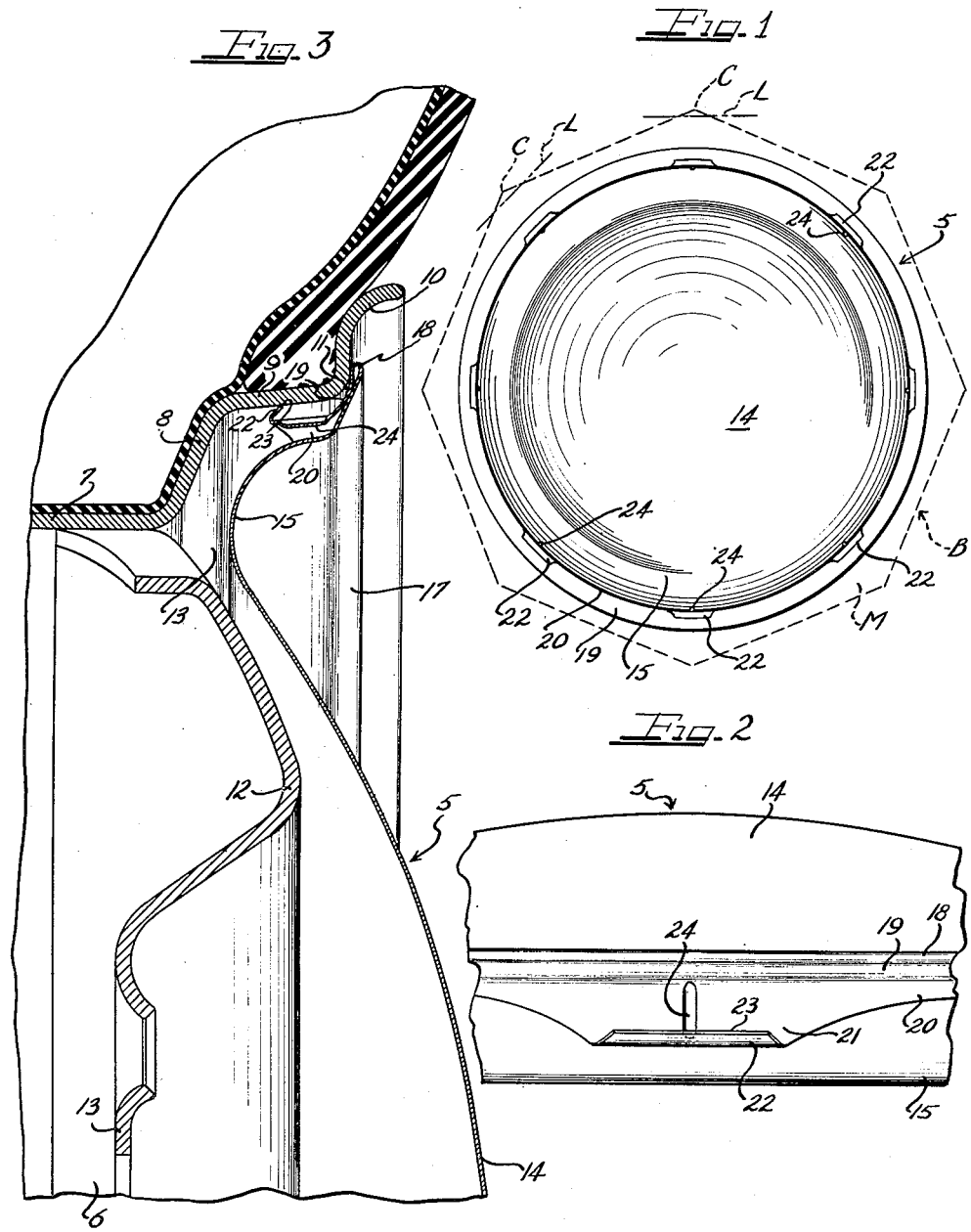

2,624,628

UNITED STATES PATENT OFFICE 2,624,628

WHEEL COVER

George Albert Lyon, Detroit, Mich.

Application September 14, 1948, Serial No. 49,240

4 Claims. (Cl. 301—37)

This invention relates to improvements in wheel structures and more particularly concerns improvements in ornamental covers for disposition at the outer side of vehicle wheels.

An important object of the present invention is to provide an improved vehicle wheel structure and more particularly an ornamental cover for the outer side of the wheel in which the cover is self-attaching by pressing the same axially inwardly onto the wheel.

Another object of the invention is to provide a vehicle wheel cover which is adapted to engage retainingly with a flange of the tire rim of the wheel in response to axially inward pressure in applying the cover and in which the cover is equipped with improved means for retaining engagement with the tire rim.

A further object of the invention is to provide a vehicle wheel cover with improved resilient tire rim gripping finger means adapted to engage the tire rim at a uniform plurality of points and retain the cover quite firmly on the wheel but which lends itself readily to pry-off force applied with not only axial but also radial components of force.

Still another object of the invention is to provide a wheel cover in which a peripheral retaining flange is formed with spaced retaining fingers of improved form and resilience.

Yet another object of the invention is to provide improved means for increasing the resilience of the retaining portion of a wheel cover which has peripheral self-retaining engagement finger structure for attachment of the cover to the tire rim of a wheel.

A still further object of the invention is to provide a novel wheel cover which is adapted to utilize for cover retaining purposes a peripheral portion thereof which in the formation of the cover served as a hold down track for the blank from which the cover is made.

It is also an object of the invention to provide an improved method of making a wheel cover wherein the hold down track is made into a cover retaining structure.

According to the general features of the invention there is provided a circular wheel cover for application to the outer side of a vehicle wheel including body and tire rim portions and with the tire rim portion having intermediate generally axially extending flange, the cover including a portion thereof overlying the tire rim and having an underturned marginal flange extending generally radially inwardly and axially inwardly, the axially inner portion of the flange having a uniform series of scallop-like projections, said projections being turned generally radially outwardly and providing retaining fingers retainingly engageable with the axial intermediate flange of the tire rim for retaining the cover on the wheel.

According to other features of the invention, each of said scallop-like portions of the cover flange has a stiffening bead therein to improve the resiliency thereof.

According to yet other features of the invention the generally axially inwardly extending flange portion is in uniformly spaced relation to the remainder of the cover radially inwardly thereof and is also adapted to be in radially spaced relation to the tire rim intermediate flange and is adapted to yield in response to pry-off force applied with radial and axial components of force for prying the cover free from the wheel.

According to other general features of the invention there is provided in a method of making a wheel cover the steps of shaping the inner portion of a polygonal blank while utilizing the margin of the blank as a hold down area, trimming off the corners of the hold down margin to provide linear edges thereon facing radially of the blank, bending the hold down flange margin inwardly upon itself and with the extremity portion thereof projecting generally axially rearwardly, and bending said trimmed corners into generally radially outward angular relation to the axially extending portion of the marginal flange to provide retaining fingers for the cover.

Other objects, features and advantages of the present invention will be readily apparent from the following detailed description of a preferred embodiment thereof taken in conjunction with the accompanying drawings, in which:

Figure 1 is a rear plan view of a cover embodying the features of the present invention;

Figure 2 is a fragmentary, enlarged edge or side elevational view of the cover; and Figure 3 is an enlarged radial sectional view through a wheel and cover assembly, showing the cover as it appears when applied to a vehicle wheel.

As shown on the drawings:

A cover 5 according to the present invention is adapted to be applied to a vehicle wheel, such as an automobile wheel or the like, of the type comprising a load sustaining body portion 6 which may be stamped from suitable gauge sheet metal and concentrically supports a tire rim 7 which may be rolled from sheet metal. The tire rim has in addition to the usual base flange, the customary side flanges 8 (only one of which is shown)

from each of which extends generally radially an intermediate flange 9 at the outer side of which is a terminal flange 10, the juncture of the intermediate and terminal flange being defined by a shoulder 11. The wheel body 6 may be formed with an intermediate annular axially outwardly extending reinforcing nose bulge 12 defining at its radially inner side a central bolt-on flange 13. At the radially outer side of the nose bulge 12, it cooperates with the tire rim and more especially the intermediate flange 9 to define a relatively deep annular, axially outwardly opening side groove 13.

In the present instance, the cover 5 is shown as comprising a one-piece sheet metal cover disk 15 which is of a diameter to substantially conceal both the tire rim and the wheel body. The cover 5 is, moreover, equipped to be self-attaching and retained on the wheel by pressing the same axially inwardly home onto the outer side of the wheel, the cover being easily removable by prying the same free from the wheel by means of a suitable pry-off tool such as a screw driver (not shown).

In a preferred form the cover comprises a relatively large diameter central convex circular crown portion 14 of substantially hub cap simulating shape and of a magnitude and extent to substantially entirely cover the wheel body 6, with the margin of the central portion 14 extending relatively deeply into the wheel groove 13. At its margin, the central portion merges on a concave curvature with an annular radially outer portion 15 defining a generally axially outwardly opening relatively large size groove generally simulative of the wheel groove 13 and affording a relatively large axially inwardly projecting convex annular rib which is received within the wheel groove 13. In addition to its ornamental value, the rib-groove portion 15 serves as a substantial marginal reinforcement for the cover.

At its outer edge, the cover portion 15 merges with a generally radially and axially outwardly extending flattened marginal area or portion 17 that is of an extent to overlie the tire rim shoulder 11 and has a cover edge finishing and reinforcing bead 18 at its outer edge and which in assembly with the wheel is adapted to engage against the shoulder 11 or the terminal flange 10 adjacent to such shoulder and thus delimit axially inward positioning of the cover in its fully assembled relation with the wheel, the remainder of the cover being maintained thereby in substantially spaced relation to the wheel and more particularly the wheel body 6.

The cover 5 is equipped with novel means for self-attachment to the wheel, and more particularly to the tire rim 7 and for this purpose an underturned marginal extremity portion in the form of a flange 19 is provided as an integral extension in one piece from the inturned inner edge of the bead 18. The flange 19 extends generally radially and axially inwardly and in the portion thereof adjacent to the bead 18 preferably engages against the inner face of the radially extending cover portion 17. Short of the rib-groove portion 15, the flange 19 extends generally axially inwardly to provide a terminal flange portion 20 which is of a diameter to provide a resilient annular flange intervening in mutually spaced relation to both the intermediate flange 9 of the tire rim and the adjacent radially outer side of the rib-groove portion 15 of the cover. For wheel retaining engagement, the flange portion 20 has a series of equally spaced, scallop-like axially inward extensions 21, the extremities of which are bent generally radially outwardly and preferably on at least a slight axially outward bias to extend angularly from the extension portions 21 and provide cover retaining fingers 22 having respective biting, wedging wheel engaging generally radially outwardly facing edges 23 disposed on a circle of a diameter preferably slightly greater than the internal diameter of the tire rim intermediate flange 9 and more especially approximately the central portion of the radially inner face of the tire rim flange. Through this arrangement, the cover 5 is adapted to be applied to the outer side of the wheel by the simple expedient of generally centering the same with respect to the outer side of the wheel and with the cover retaining fingers 22 disposed within the confines of the tire rim shoulder 11, and then pressing axially inwardly on the cover to slide the retaining fingers 22 axially inwardly along the inner face of the tire rim flange 9 until the cover is fully seated by engagement of the marginal bead 18 thereof against the tire rim. In this position, the retaining fingers 22 which, due to the diametrical differential between their edges 23 and the inner face of the tire rim flange 9 effect a firm wedging, biting interengagement with the engaged face of the tire rim flange and substantially retain the cover against withdrawal from the retained mounted position on the wheel.

As will be perceived in the drawings, the retaining fingers 22 are relatively short. Therefore in view of their angular relation to the flange extension portions 21, the fingers are relatively stiff, and in effect afford transverse stiffening reinforcement for the ends of the extensions 21. This improves the resiliency of the portions 21 and assures that by the radially inward deflection of the portions 21 as a result of mounting the cover and the engagement of the tire rim intermediate flange 9 by the fingers 22, uniform radially outward tension is continuously exerted against the retaining fingers 22 for maintaining the same in their retaining interengagement with the tire rim flange 9. Considered from one viewpoint, the retaining flange portions 21, together with the retaining fingers 22, provide relatively stiffened spaced tensioning areas on the flange 20, which intermediate the retaining portions 21 acts to join all of the portions 21 together for mutual tensioning of the retaining portions 21 and the retaining fingers 22 by affording substantially resilient tensioning bridges between the portions 21 resisting radially inward deflection of the portions 21 and yet being resiliently deflectable in response to such deflection as incident to mounting of the cover on the wheel by bowing radially outwardly to the extent demanded by the diminution of the annulus of the flange 20 resulting from the inward deflection of the portions 21. Even though there may be only very slight or practically imperceptible actual radially outward bowing of the intermediate portions of the flange 20, the gradually widening merger of said intermediate portions with the retaining extension portions 21 assures high quality tensioning of the latter for cover retention purposes.

For improving the resilience and thus cover retaining tensioning properties of the retaining extension portions 21, each of them is preferably formed with a longitudinally extending stiffening rib 24 which preferably extends from proximity to juncture of the retaining finger 22 thereof to the juncture of the flange portion 20 with the remainder of the flange 19. By substantially preventing bending of the respective extension portions 21 on a peripheral or transverse line, the ribs 24 improve the resilience of the respective portions 21 and assure tensioning cooperation of the intervening portions of the flange 20. Thus, the portions 21 are reinforced both transversely and longitudinally, and together with the remaining portions of the flange 20 are capable of a high degree of resilient tension under the deflection imposed through the fingers 22 incident to attachment of the cover to the wheel.

Although the cover 5 is, through the medium of the retaining structure just described held quite effectively upon the wheel against all of the ordinary and even to a large extent against extraordinary hazards encountered in the operation of the wheel with which associated, no unusual problem is presented when it is desired to remove the cover from the wheel. This may be effected in the customary manner through the medium of a pry-off tool such as a screw driver which is adapted to be applied conveniently between the outer edge reinforcing bead 18 of the cover and the shoulder 11 of the tire rim, the latter serving as a fulcrum in the application of pry-off force to the cover. As an incident to the pry-off force, the cover is subjected not only to axially outward force but also to a component of radial force, this latter component being exerted radially inwardly adjacent to the point of pry-off tool force application and being reflected radially outwardly at the diametrically opposite side of the cover. As this occurs, the adjacent retaining extension 21 and its retaining finger 22 are substantially relieved of their retaining tension normally exerted against the tire rim flange 9, and the grip of the retaining finger 22 is thus loosened, and the cover thus permitted to move axially outwardly adjacent to the point of pry-off tool force by slipping of the adjacent retaining finger edge 23 on the tire rim flange 9. By reason of the resilience of the retaining flange 20 the radially exerted component of pry-off tool force causes the flange to yield to the desired extent when the cover is shifted radially by the pry-off tool force. Furthermore, due to the resiliency of the flange 20 and the retaining extensions 21 thereof, the selective or asymmetrical deflection thereof is possible throughout a substantial range without any permanent set taking place in the material thereof. As a result after the cover is free from the wheel, the flange 20 and its retaining extensions 21 resume their symmetrical relation so that the cover can be effectively replaced upon the wheel.

The present cover is susceptible of quite economical manufacture. To this end, it is adapted to be made from an originally polygonal sheet metal blank identified at B in Fig. 1, such blank in a preferred form being of octagonal shape. This enables the blank to be derived from a sheet metal strip in the most economical manner and with virtually no waste. Then, the entire margin of the blank, instead of being wasted by subsequent trimming, is utilized in the cover. In the initial stages of formation of the cover, the margin of the blank identified at M in Fig. 1, serves as a hold down track or area which is clamped between holding portions of a die assembly while the central portion of the cover is drawn to provide the central or crown portion 14, the groove-rib portion 15 and the marginal flange portion 17. During this part of the manufacturing process, the hold down marginal portion M retains the blank for uniform drawing thereof. Subsequently, the sharp corners of the blank identified at C are trimmed to remove merely small triangular apex portions by severance along lines L so as to provide the retaining finger engagement edges 23. Although the severance lines L may be straight, they may also be slightly curved in order to afford a curved delineation to the edges 23, if desired. Thereafter, the margin M is bent by suitable die equipment to turn the same under, provide the bead 18 and also the flange 19. The reinforcing ribs 24 are then stamped in the scallop-like retaining extension portions 21 of the retaining flange portion 20 in the areas which originally were the corners of the blank. Finally the terminal areas of the portions 21 are bent up to provide the retaining fingers 22.

It will thus be apparent that by the present method of making the cover, there is an absolute minimum of waste due to trimming, and almost the entire blank with which the manufacturing process starts is utilized in the finished cover, the hold down marginal or track portion of the blank serving in the finished cover as the retaining means of the cover.

I claim as my invention:

1. In a vehicle wheel structure including body and tire rim portions and with the tire rim portion having an intermediate generally axially extending flange, the cover including a portion thereof for overlying the tire rim and having an underturned marginal flange extending generally radially inwardly and axially inwardly, the axially inner portion of the flange having a uniform series of scallop-like projections, said projections being turned generally radially outwardly and providing retaining fingers retainingly engageable with the axial intermediate flange of the tire rim for retaining the cover on the wheel, each of said scallop-like portions of the cover flange having a stiffening bead therein to improve the resiliency thereof.

2. In a wheel cover of the character described, a wheel body having a marginal generally axially extending flange, said flange having a plurality of generally axially extending extension portions, each of said extension portions having a generally radially outwardly extending narrow terminal flange serving as a retaining finger and reinforcing the extension to be substantially improved in resiliency, and a longitudinally extending reinforcing rib in each of the extensions from a point adjacent to the reinforcing and retaining finger flange.

3. A wheel cover having a plurality of marginal inwardly extending retaining fingers including elongated body portions and generally radially extending short terminal flanges, each of said body portions having longitudinally extending reinforcing means to stiffen the same, said reinforcing means comprising a longitudinally extending rib.

4. A circular wheel cover made from sheet metal and having an outer peripheral margin reinforced by multiple layers of metal extending generally radially and defining a shoulder formed to fit over a part of a wheel rim, said margin having therebehind and spaced radially inwardly from its edge a generally axially extending flange provided with a plurality of finger extensions resiliently yieldable in radial directions and mutually resisting such yielding by the common connection through said flange, said extensions having radially outwardly extending short and stiff angular terminals for biting engagement with a surface of the wheel, said flange and resilient extensions and stiff terminals cooperating with each other in self-centering the cover on the wheel, each of said finger extensions having a stiffening bead therein to improve the resiliency thereof.

GEORGE ALBERT LYON.

REFERENCES CITED

The following references are of record in the file of this patent:

UNITED STATES PATENTS

| Number | Name | Date |
|---|---|---|
| Re. 19,467 | Lyon | Feb. 12, 1935 |
| 1,944,658 | Griffith | Jan. 23, 1934 |
| 2,109,671 | Lyon | Mar. 1, 1938 |
| 2,239,897 | Lyon | Apr. 29, 1941 |
| 2,254,376 | Lyon | Sept. 2, 1941 |
| 2,316,346 | Lyon | Apr. 13, 1943 |
| 2,358,984 | Lyon | Sept. 26, 1944 |
| 2,368,228 | Lyon | Jan. 30, 1945 |